United States Patent
Horng et al.

(10) Patent No.: US 7,092,737 B2
(45) Date of Patent: Aug. 15, 2006

(54) MIMO SYSTEMS WITH RATE FEEDBACK AND SPACE TIME TRANSMIT DIVERSITY

(75) Inventors: Jyhchau Horng, Warren, NJ (US); Jinyun Zhang, New Providence, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 500 days.

(21) Appl. No.: 10/209,306

(22) Filed: Jul. 31, 2002

(65) Prior Publication Data

US 2004/0204104 A1    Oct. 14, 2004

(51) Int. Cl.
*H04M 1/00*    (2006.01)
(52) U.S. Cl. .............. 455/562.1; 455/561; 375/295
(58) Field of Classification Search .......... 455/562.1, 455/561, 454, 450, 452.1, 456.5; 375/267, 375/295, 130, 335; 370/320, 349
See application file for complete search history.

(56) References Cited

U.S. PATENT DOCUMENTS

| | | | |
|---|---|---|---|
| 2003/0016640 A1* | 1/2003 | Onggosanusi et al. | 370/335 |
| 2003/0063654 A1* | 4/2003 | Onggosanusi et al. | 375/130 |
| 2003/0125040 A1* | 7/2003 | Walton et al. | 455/454 |
| 2003/0128658 A1* | 7/2003 | Walton et al. | 370/208 |
| 2003/0156572 A1* | 8/2003 | Hui et al. | 370/349 |
| 2003/0210750 A1* | 11/2003 | Onggosanusi et al. | 375/295 |

\* cited by examiner

*Primary Examiner*—Matthew D. Anderson
*Assistant Examiner*—Tan Trinh
(74) *Attorney, Agent, or Firm*—Dirk Brinkmen; Andrew J. Curtin

(57) ABSTRACT

A method and system transmits a stream of data symbols in a multiple-input/multiple-output wireless communications system that includes M pairs of transmitting antennas. The stream of data symbols are demultiplexed into M sub-streams and adaptively modulated and coded to a maximum data rate while achieving a predetermine performance on an associated channel used to transmit the sub-stream. Space-time transmit diversity encoding is applied to each coded sub-stream to generate two output streams, one output stream for each antenna.

10 Claims, 1 Drawing Sheet

MIMO SYSTEMS WITH RATE FEEDBACK AND SPACE TIME TRANSMIT DIVERSITY

FIELD OF THE INVENTION

The invention relates generally to wireless communications, and more particularly to multiple input/multiple output wireless communications systems with variable rate encoding.

BACKGROUND OF THE INVENTION

In a wireless communication system, such as $3^{rd}$ generation (3G) wireless code-division multiple access (CDMA) system, is desired to concurrently support multiple services and multiple data rates for multiple users in a fixed bandwidth channel. One scheme uses adaptive modulation and coding (AMC) to modulate and encode user data symbols before transmission.

In order to increase the capacity of a wireless communication system in fading channel environments, transmit diversity is widely adopted. In 3G systems, an open loop solution uses two antennas for transmission and a single antenna for reception. In such a system, every two symbols of the transmitted data is further encoded by a space-time transmit diversity (STTD) encoder to generate four encoded symbols, two symbols for each antenna. Each antenna transmits different symbol streams through the channel to reach diversity gains.

To support real-time multimedia services in a fixed channel bandwidth, multiple input/multiple output (MIMO) systems have been developed for high data rate transmissions in wireless communication systems, such as high speed downlink packet access (HSDPA) in WCDMA systems. In a MIMO system, multiple antennas are used by the transmitter and the receiver to increase the capacity of the system.

In general, the system capacity is improved as the dimension of the diversity, i.e., number of the antennas, increases. For very high speed transmission, a large number of antennas might be necessary to reach the target performances. One solution to this problem is to extend the current STTD system to MIMO configurations. In such a system, the compatibility with the current STTD system needs to be remained in order to use current STTD system for lower data rate transmission, such as voice services, while the system capacity is improved due to the use of MIMO configurations.

SUMMARY OF THE INVENTION

The invention provides a transmitter for multiple input/ multiple output (MIMO) wireless communications systems. The invention is compatible with space time transmit diversity (STTD), which is widely adopted in 3G wireless communication systems, such as W-CDMA systems for the 3GPP standard, and CDMA2000 systems for the 3GPP2 standard.

The invention applies adaptive modulation and coding (AMC) to each sub-group of the antenna systems to match different channel conditions with required service performance and reach the maximal system capacities. More specifically, this invention is suitable for high data rate transmission for MIMO systems, while remains the compatibility of the existing STTD schemes. The invention can be used for high data rate transmission, as well as for lower rate transmissions such as voice services, to increase the total number of the active users within one cell.

DETAILED DESCRIPTION OF THE PREFERRED EMBODIMENT

Figure 1:
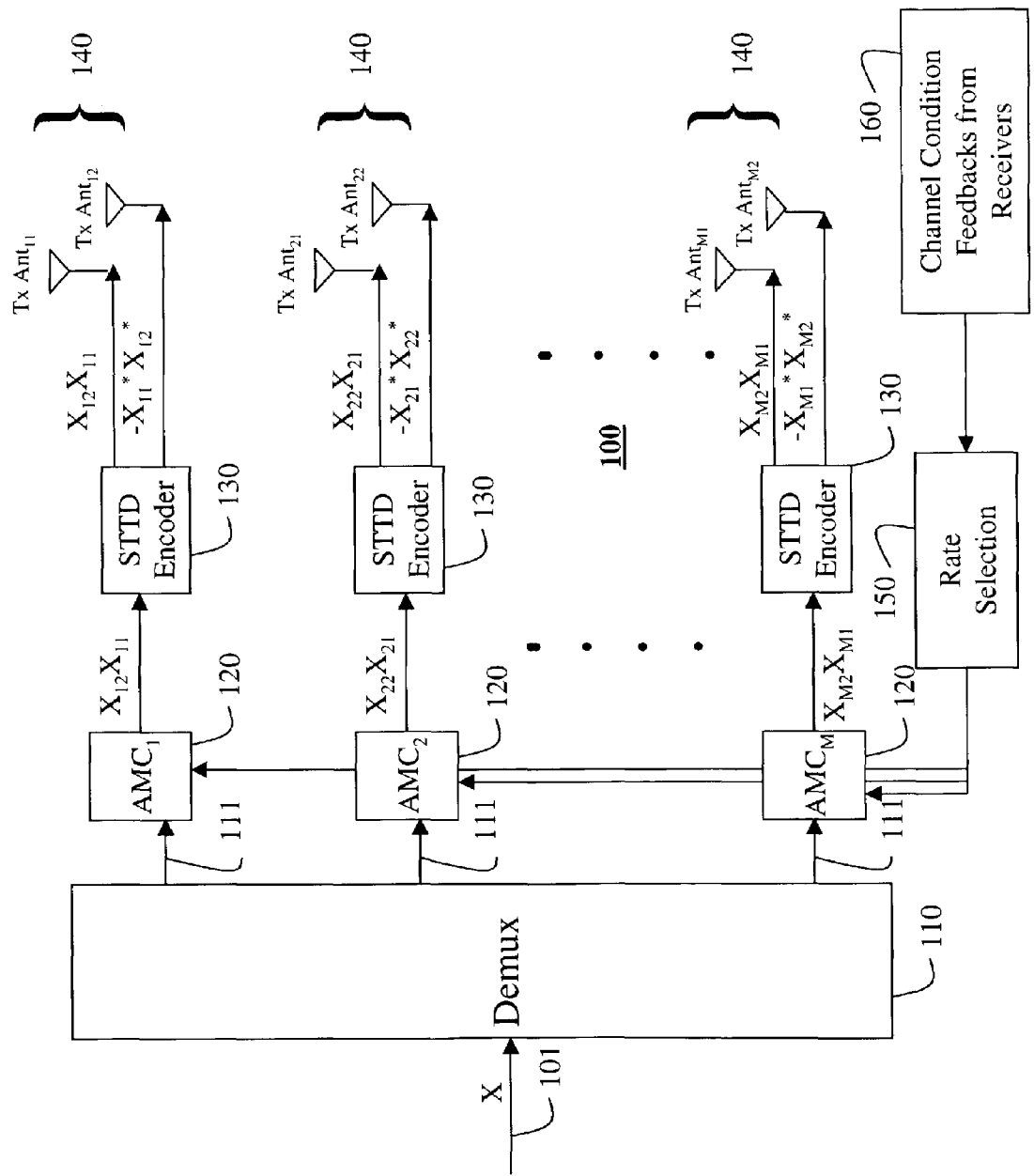
FIG. 1 is a block diagram for a transmitter in a multiple-input/multiple-output wireless communications system according to the invention.

FIG. 1 shows a transmitter 100 for a multiple-input/multiple-output (MIMO) wireless communications system according to the invention. The transmitter 100 includes a demultiplexer 110 coupled to multiple (M) adaptive modulation and coding (AMC) blocks 120. The output of each AMC block is coupled to a space-time transmit diversity (STTD) encoder 130s. The outputs of the STTD encoders are coupled to N antennas 140, where each encoder is coupled to two antennas.

The system 100 also includes a rate selector 150 receiving channel conditions 160 from receivers, not shown. The channel conditions can include the received signal-to-noise-ratio (SNR) for each transmit channel. The channel conditions 160 can be updated periodically, or as needed.

During operation of the system 100, a stream of data symbols X 101 is first demultiplexed 110 into M sub-streams 111, where M is half the total number N antennas 140. The M sub-streams are encoded by the M AMCs 120 at M data rates.

The M data rates are determined by the channel condition feedbacks 160 from the receivers. Accordingly, each AMCs encodes the sub-stream at a maximum data rate to achieve a predetermined service performance for the associated channel. Essentially, the service performance is a measure of the error rate, e.g., bit error rate (BER), frame error rate (FER), or SNR.

The AMCs 120 use a predefined combinations of modulations, e.g., QPSK, 8-PSK, 16-QAM, etc, and channel codings, such as convolutional coding and turbo coding with various coding rates, which define the information rates or capacity for each sub-stream. Here, a better channel condition means a higher data rate is achievable with a predetermined service performance under such a channel condition.

For each sub-stream 111, the corresponding AMC block 120 outputs the information symbols $X_{i1}$ and $X_{i2}$, for i=1, 2, ..., M, which are feed to the STTD encoder block 130, as shown in FIG. 1. The STTD 130 encodes the input information symbols and the outputs are given by $$\begin{bmatrix} X_{i2} & X_{i1} \\ -X_{i1}^* & X_{i2}^* \end{bmatrix}, \quad (1)$$

where * is the complex conjugate. Each row of the STTD output matrix in Equation (1) represents the output to a specific transmit antenna 140. There are two transmit antennas for each sub-stream 111, and therefore, there are total N=2M antennas 140.

In order to adaptively allocate different data rates for each sub-stream 111, it is necessary for the receiver to perform channel or SNR estimations for the received signal from each transmit antenna, and report this back to the transmitter as the channel condition 160.

The feedback information can be encoded and modulated for transmission in order to reduce errors in the feedback information. The channel condition feedbacks can be updated periodically from the receivers. In general, higher update frequency is favorable in order to follow the channel condition closely, which achieves higher system capacity. In order to keep the feedback information amount a reasonable size, the number of modulation and channel coding combinations is as small as possible.

This invention is not only limited to the high data rate transmission, but can also be effectively deployed for lower rate transmissions such as voice services, which will increase the total number of the active users within one cell.

It is to be understood that various other adaptations and modifications may be made within the spirit and scope of the invention. Therefore, it is the object of the appended claims to cover all such variations and modifications as come within the true spirit and scope of the invention.

The invention claimed is:

1. A method for transmitting a stream of data symbols in a multiple-input/multiple-output wireless communications system including M pairs of transmitting antennas, comprising:
   demultiplexing the stream of data symbols into M sub-streams;
   adaptively modulating and coding each sub-stream to a maximum data rate while achieving a predetermine performance on an associated channel used to transmit the sub-stream; and
   space-time transmit diversity encoding each coded sub-stream into two output streams, one output stream for each of a pair of antennas.

2. The method of claim 1 further comprising:
   feeding back, from a receiver, channel conditions of the associated channel; and
   selecting the maximum data rate based on the channel conditions.

3. The method of claim 2 wherein the channel conditions measure a signal to noise ratio.

4. The method of claim 2 wherein the channel conditions measure an error rate.

5. The method of claim 2 wherein the channel conditions are updated periodically.

6. A transmitter for transmitting a stream of data symbols in a multiple-input/multiple-output wireless communications system including M pairs of transmitting antennas, comprising:
   a demultiplexer generating M sub-streams from the stream of data;
   an adaptive modulation coder coding each sub-stream to a maximum data rate while achieving a predetermine performance on an associated channel used to transmit the sub-stream;
   a space-time transmit diversity encoder encoding each sub-stream into two output stream; and
   an antenna for each output stream.

7. The transmitter of claim 6 comprising:
   a receiver feeding back channel conditions of the associated channels; and
   a rate selector signaling rate information to the adaptive modulation coders based on the channel conditions.

8. The transmitter of claim 7 wherein the receiver further comprises:
   means for measuring a signal to noise ratio.

9. The transmitter of claim 7 wherein the receiver further comprises:
   means for measuring an error rate.

10. A system for transmitting a stream of data symbols in a multiple-input/multiple-output wireless communications system including M pairs of transmitting antennas, comprising:
    a demultiplexer configured to demultiplex the stream of data symbols into M sub-streams;
    means for adaptively modulating and coding each sub-stream to a maximum data rate while achieving a predetermine performance on an associated channel used to transmit the sub-stream;
    means for space-time transmit diversity encoding each coded sub-stream into two output streams, one output stream for each antenna.

* * * * *